United States Patent [19]

Foster et al.

[11] Patent Number: 4,730,833
[45] Date of Patent: Mar. 15, 1988

[54] LARGE DIAMETER DIRT AND OIL SEAL FOR A TRACTION MOTOR GEARCASE

[75] Inventors: Robert B. Foster; Dale C. Walker, both of Erie, Pa.

[73] Assignee: General Electric Company, Erie, Pa.

[21] Appl. No.: 946,723

[22] Filed: Dec. 29, 1986

[51] Int. Cl.⁴ .................. F16J 15/12; F16H 57/02; F16P 1/02

[52] U.S. Cl. ................................. 277/12; 277/166; 277/192; 277/DIG. 4; 74/606 R; 74/609; 384/433

[58] Field of Search ............ 277/12, 32, 166, 192, 277/197, 199, DIG. 4; 384/140, 145, 151, 153, 477, 433, 438; 74/606 R, 606 A, 607–609

[56] References Cited

U.S. PATENT DOCUMENTS

| | | | |
|---|---|---|---|
| 2,657,675 | 11/1953 | McGowen | 277/12 X |
| 2,840,396 | 6/1958 | Hennessy | 277/DIG. 4 X |
| 2,954,263 | 9/1960 | Kalny | 308/36.1 |
| 3,140,903 | 7/1964 | Stricklin et al. | 308/36.1 |
| 3,667,318 | 6/1972 | Lock | 74/609 |
| 3,727,483 | 9/1973 | Hanson et al. | 74/609 |
| 4,200,345 | 4/1980 | Walker | 308/36.1 |
| 4,337,954 | 7/1982 | Backliu et al. | 277/32 X |
| 4,470,324 | 9/1984 | Renk et al. | 74/606 R |
| 4,504,065 | 3/1985 | Devine | 277/12 |
| 4,603,865 | 8/1986 | Bien | 277/12 |

FOREIGN PATENT DOCUMENTS 163721 4/1922 United Kingdom ............ 277/12

Primary Examiner—Robert S. Ward
Attorney, Agent, or Firm—Albert S. Richardson, Jr.

[57] ABSTRACT

For sealing the axle opening in a traction motor gearcase on the motor side thereof, an annular member of elastomeric material has a sleeve portion that is adapted to be clamped to a motor-supporting axle bearing thrust flange and a radially outwardly projecting flange portion that is adapted to fit inside an annular groove formed in an edge of the gearcase sidewall that surrounds the hub of an axle gear adjacent to the thrust flange. The seal further comprises a reinforcing ring having concentric outer and inner sections: the outer section is attached to the flange portion of the annular member to ensure a tight fit in the aforesaid groove, and the inner section extends from the groove to within close proximity of the axle gear hub and forms, with the axle-gear end of the sleeve portion, an annular trough for collecting axle bearing lube oil that escapes through the gear hub-thrust flange interface.

6 Claims, 6 Drawing Figures

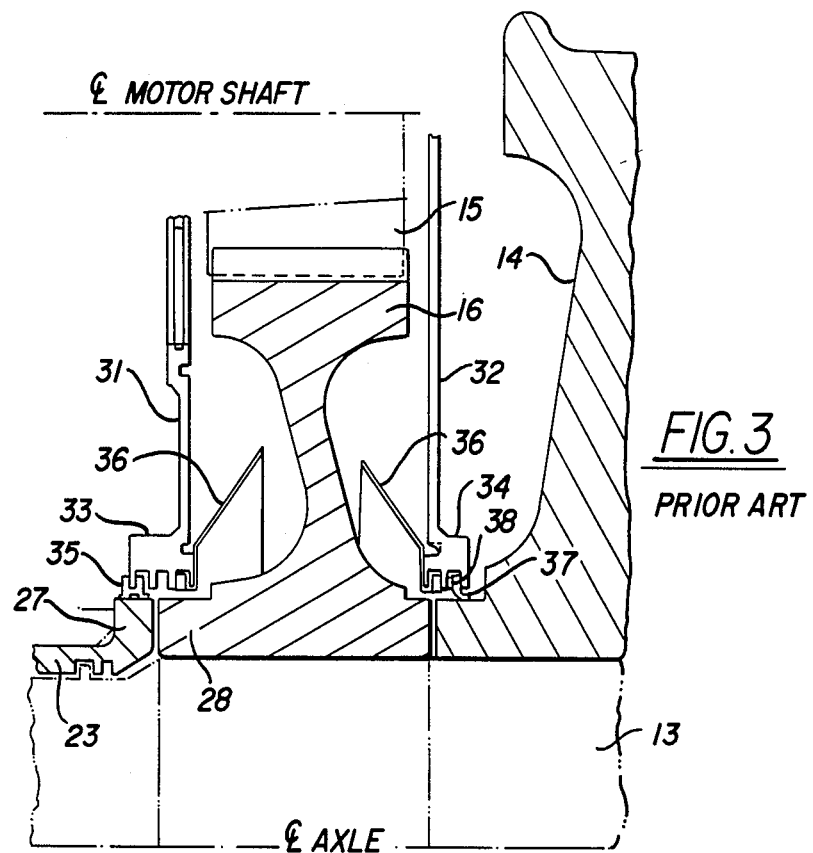
FIG. 3
PRIOR ART
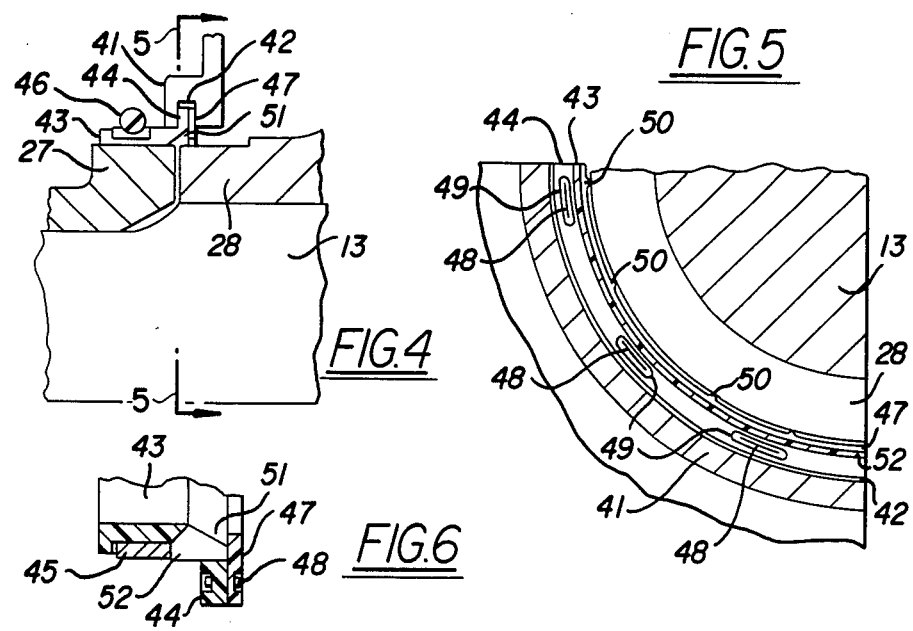
FIG. 4
FIG. 5
FIG. 6

LARGE DIAMETER DIRT AND OIL SEAL FOR A TRACTION MOTOR GEARCASE

BACKGROUND OF THE INVENTION

This invention relates generally to dirt and oil seals for gear train housings associated with axle-mounted electric traction motors of electrically propelled traction vehicles, and it relates more particularly to an improved arrangement for sealing the annular gaps between gearcase sidewall and both the hub of an axle gear and the thrust flange of an adjacent motor support axle bearing.

Propulsion of an electric or a diesel-electric locomotive is accomplished by means of a plurality of traction motors mounted on the trucks of the locomotive between the wheels that are affixed to opposite ends of the respective axles. As is shown, for example, in U.S. Pat. No. 2,954,263, such a motor typically is hung from the associated axle, with its magnet frame or stator being supported by the respective housings of a pair of axle bearings. The pinion end of the motor shaft is drivingly coupled to the associated axle-wheel set by suitable gearing housed in a rugged gearcase made of either metal or a suitable non-metallic material. Because of their proximity to the road bed of the railroad track, the gearcase and the axle bearings are exposed during operation of the locomotive to a hostile environment of dirt and other undesirable contaminants. Therefore it is customary in this art to provide various sealing means for impeding ingress of dirt and other foreign matter into the gearcase and bearing regions and for impeding egress of lubricants from these components.

On the wheel side of a gearcase, a dynamic seal is required in the annular gap between the outboard sidewall of the relatively stationary gearcase and the rotating wheel hub. On the motor side, a static seal is required in the annular gap between the other sidewall of the gearcase and the non-rotatable housing of the motor support axle bearing. In the latter case, however, the static seal does not prevent undesirable migration of lubricating oil from the axle bearing region into the gearcase.

The prior art gearcase that is disclosed in U.S. Pat. No. 3,727,483 includes two seal-retaining annular grooves in the sidewall flange that circumscribes the axle on the motor side of the gearcase. One of these grooves overlies the axle bearing and accommodates the required static sealing means. The second groove overlies the hub of the rotatable axle gear inside the gearcase and accommodates a dynamic sealing unit that impedes the egress of gear lubricant. Another annular groove is disposed between the first and second grooves, and a hole at its lowest point provides a drain for gear lubricant that may leak through the sealing unit in the second groove and for lubricating oil from the axle support bearing that escapes through the interface between the hub of the axle gear and the adjacent end of this bearing. The middle groove and drain hole are intended to obviate migration of axle bearing lubricating oil into the gearcase.

SUMMARY OF THE INVENTION

A general objective of the present invention is to provide, for a traction motor gearcase, an improved dirt and oil seal that is multifunctional and effective in service yet is practical and economical to manufacture and to install.

Another general objective of the invention is to provide a novel, durable gearcase seal that not only prevents ingress of dirt but also (1) provides some desirable lateral support for the gearcase wall and (2) impedes axle bearing lube oil from leaking into the gearcase.

In one form the improved seal comprises an annular member of elastomeric material having a sleeve portion snugly encircling an axle bearing thrust flange where it is firmly secured by releasable clamping means (such as a hose clamp), and having a flange portion that projects radially outwardly from the sleeve portion. The flange portion of the annular member fits inside an annular groove formed in an edge of the gearcase sidewall that defines a circular opening through which a vehicle axle extends. An annular outer section of a reinforcing ring of relatively stiff material is attached to the aforesaid flange portion so as to obtain a tight fit of the seal in the groove, whereby the seal will act as a stiffener to provide some lateral support for the gearcase sidewall. Such support is desirable if the gearcase is made of non-metallic material such as glass fiber reinforced plastic. An annular inner section of the same reinforcing ring extends radially inwardly from the groove to within close proximity of the gear hub that is affixed to the axle adjacent to the thrust flange, and an annular trough is formed between the outboard side of this inner section and the sleeve portion of the annular member. The trough collects axle bearing lube oil that escapes through the thrust flange-gear hub interface, and the collected oil can drain through a slot in the lowest region of the annular member. Thus the reinforcing ring and annular trough in combination provide the desired liquid seal in the gap between the axle gear hub and the surrounding edge of the gearcase sidewall.

BRIEF DESCRIPTION OF THE DRAWINGS

The invention will be better understood and its various objects and advantages will be more fully appreciated from the following description takn in conjunction wih the accompanying drawings in which:

FIG. 3 is an enlarged plan view of a portion of the lower half of the gearcase shown in FIG. 2, showing sections of the axle gear and of the thrust flange of the adjacent axle bearing and showing one end of the lower half of a prior art static seal in the annular gap between the thrust flange and a sidewall of the gearcase;

FIG. 4 is an end view of the improved dirt and oil seal of the present invention;

FIG. 5 is a side view of the seal through section 5—5 of FIG. 4; and

FIG. 6 is an enlarged cross-sectional view of the lowest region of the FIG. 4 seal.

DETAILED DESCRIPTION

Figure 1:
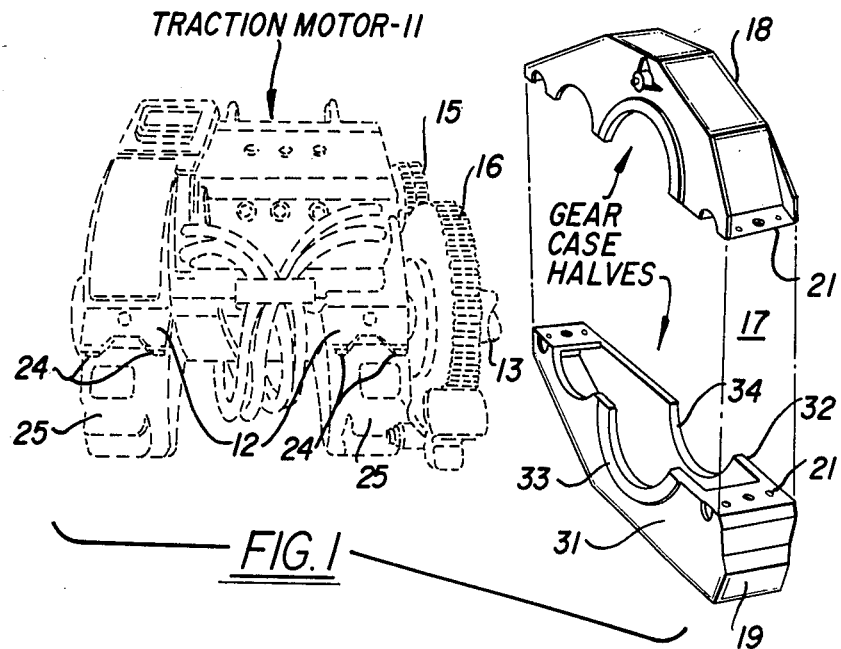
FIG. 1 is an isometric view of an axle-hung traction motor and gear train (shown in broken lines), including an exploded view of the gearcase that houses the gear train.
Figure 2:
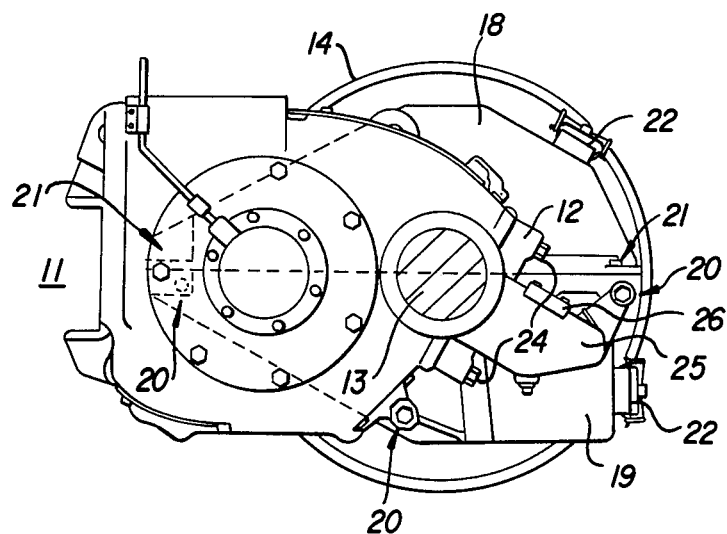
FIG. 2 is a side elevation, from the commutator end, of the traction motor, axle and gearcase.

FIGS. 1 and 2 show a conventional traction motor 11 of a traction vehicle such as an electric or diesel-electric locomotive, a pair of axle bearing caps 12 bolted to the motor frame, an axle 13 rotatably captured between the motor frame and axle bearing caps, and a driven wheel 14 affixed to the axle 13. The motor 11 is preferably a conventional d-c traction motor having a stator and a rotor. It is disposed between the illustrated wheel 14 and a companion wheel that share the same axle 13 and form an axle-wheel set therewith. Its stator or frame is mounted on the axle by means of sleeve bearings under the caps 12. At one end of the motor 11 the motor rotor is drivingly coupled to the axle 13 by means of suitable torque amplifying gearing comprising a relatively small diameter pinion 15 on the motor shaft and a large diameter bull gear 16 on the axle 13. This gear train is housed in a gearcase 17 having complementary upper and lower halves 18 and 19, respectively. The gearcase can be fabricated from steel plate, or each half can be molded, stamped or otherwise formed in one piece from plastic material reinforced with glass fibers or the like.

As is shown in FIG. 2, the lower half 19 of the gearcase 17 is bolted to the motor frame and to one of the axle bearing caps at three places 20, and the two halves are bolted together at 21. For adding lubricant to the gearcase and for checking its level, suitable access openings are provided near the top of the upper half 18 and near the bottom of the lower half 19, and these openings are covered by caps 22. To retain the motor and to prevent rotation of the motor frame, the housing of the motor is also attached to the frame of the locomotive truck. (In accordance with conventional practice, each truck of a locomotive includes a frame supported by coil springs which are seated on the journal boxes located at opposite ends of the respective axles of two or three axle-wheel sets, and the superstructure and power plant of the locomotive are in turn supported on center plates mounted on the frames of two such trucks.)

Each of the motor support axle bearings is actually a split sleeve bearing comprising a pair of semi-cylindrical half sleeves disposed on opposite sides of the axle 13. The upper half sleeve 23 (see FIG. 3) has a solid metal wall and mates with a concave axle bore of the relatively stationary magnet frame of the motor 11, whereas the second half sleeve has a window in its wall and is disposed in the axle bearing cap 12. The cap 12 is fastened to the motor frame by four bolts 24, thereby clamping both the bearing and the motor to the axle 13. The bearing sleeves are keyed to the motor frame to prevent relative rotation therebetween.

Inside the axle bearing cap 12 a lubricator wick (not shown) extends from a reservoir 25 of lubricating oil, through the window in the second bearing sleeve, and into lubricating contact with the bearing surface of the rotating axle 13. The wick is held in place by a suitable spring loaded bracket that is suspended from the underside of a removable carrier plate 26 on the reservoir 25. The reservoir includes plugged fill and drain holes for the lubricating oil. For more details of a typical axle bearing of this type, see U.S. Pat. No. 2,954,263.

As is indicated in FIG. 3, the half sleeves of the axle bearing terminate in a radially outwardly projecting metal thrust flange 27 that offers an axially facing thrust surface cooperating with an opposed complementary thrust face of the rotatable metal hub 28 of the axle gear 16. Part of the lubricating oil that is fed by the lubricator wick to the bearing surface of the axle 13 and to the journal surfaces of the bearing sleeves (23) will also flow between the juxaposed thrust surfaces of flange 27 and hub 28 where it reduces friction and minimizes wear of this interface. Preferably the outside diameter of the thrust flange 27 is approximately the same as the outside diameter of the axle gear hub 28, and in a typical locomotive both are of the order of 10.5 inches or larger.

To prevent dirt particles from entering the region between the axle gear hub 28 and the thrust flange 27 of the adjacent axle bearing, and to prevent grease and oil from leaking out of the gearcase 17 around the axle 13, it is conventional practice to install a static seal in the annular gap between the thrust flange and the surrounding edge of the gearcase sidewall. An example of a known seal of this kind is shown in FIG. 3 where reference numbers 31 and 32 identify opposite sidewalls of the lower half 19 of the gearcase on its motor and wheel sides, respectively.

Both of the sidewalls 31 and 32 of the lower half of the gearcase 17 have registering semi-circular cutouts which, in cooperation with duplicate cutouts in the corresponding sidewalls of the upper half of the gearcase (FIG. 1), provide a pair of circular openings through which the axle 13 extends. (The motor-side sidewall 31 has a separate, smaller semi-circular cutout which, in cooperation with a duplicate cutout in the corresponding sidewall of the upper half, provides a circular opening for the pinion-end bearing of the motor shaft.) The edge of the sidewall 31 that defines the axle opening comprises a flange 33 in which three semi-annular grooves are formed, and the edge of the sidewall 32 that defines the axle opening comprises a flange 34 in which two semi-annular grooves are formed. The corresponding sidewalls of the upper half of the gearcase 17 obviously have duplicate flanges with complementary semi-annular grooves, whereby the thrust flange 27 of the motor support axle bearing and the hub of the wheel 14 are respectively encircled by annular grooved flanges when the two halves 18 and 19 of the gearcase are assembled. It will be convenient hereinafter to describe the gearcase sealing means in an assembled state, it being understood that each annular member associated with each pair of mating sidewall flanges in reality consists of a pair of cooperating semi-annular parts.

As is indicated in FIG. 3, the prior art static seal in the annular gap between the axle bearing thrust flange 27 and the axle bore flange 33 of the gearcase sidewall 31 comprises a ring 35 of elastomeric material having a pair of spaced apart annular lips that project radially inwardly from the body of the ring. An annular slot in the radially outer surface of the body embraces the exterior wall of the outboard groove of the flange 33 so that part of the ring 35 is disposed in the outboard groove, and the two lips are seated firmly on the circumference of the thrust flange 27. The resulting seal is effective to keep dirt out of and oil in the gearcase, but it does not prevent axle bearing oil from migrating into the gearcase from the interface region between thrust flange 27 and gear hub 28. Such migration is undesirable because it tends to dilute the gearcase lubricant with bearing oil of lower viscosity. (Note that the higher viscosity lubricant in the gearcase will be deflected from the space around the hub 28 by a conventional annular "gutter" 36 of semi-rigid nylon that is anchored in the inboard groove of the sidewall flange 33.)

FIG. 3 also illustrates a prior art dynamic or rubbing seal comprising a ring 37 of elastomeric material that is retained in the outboard groove of the axle bore flange 34 of the sidewall 32 on the wheel side of the gearcase. This ring has an inwardly projecting pliable lip that firmly but slidingly engages the perimeter of a rotatable hub of the wheel 14 to prevent the loss of lubricant from within the gearcase and to prevent the entrance of dirt, dust, and grit into the gearcase. To help retain the ring 37 in the outboard groove of flange 34, a reinforcing ring 38 of stiffer material (e.g., semi-rigid nylon) is suitably attahced to one side of the portion of the ring 37 that is disposed inside this groove.

The improved, multifunctional dirt and oil seal of the present invention will now be described with reference to FIGS. 4–6. While it is intended to be used in place of prior art static seals in the axle opening of a locomotive gearcase sidewall on the motor side of the gearcase, the improved seal is also useful in other applications, and its advantages can be realized most fully when used with relatively lightweight, non-metallic gearcases. In FIG. 4 the reference number 41 identifies an edge or flange of the gearcase sidewall that defines the circular opening through which the axle extends. This flange has a seal-receiving annular groove 42 surrounding the axle gear hub 28, but it is shorter (in the axial direction) than the prior art flange 33 and does not overlie the thrust flange 27.

As is indicated in FIGS. 4–6, the improved sealing means comprises an annular member of elastomeric material having a cylindrical sleeve portin 43 that is adapted to snugly encircle the circumference of the axle bearing thrust flange 27, and having an integral flange portion 44 of larger diameter that projects radially outwardly from the end of the sleeve portion 43 closest to the axle gear hub 28. (As was noted hereinbefore, although the sealing member 43,44 is described as "annular," it actually comprises a pair of complementary pieces which individually are substantially semi-annular but which cooperate with one another, when the two halves of the gearcase are assembled, to form a unitary static seal around the thrust flange of the split axle-bearing sleeves which in turn circumscribe the axle 13.) The sleeve portion 43 of the member 43,44 is firmly secured to the circumference of the thrust flange 27 by suitable means such as a hose clamp. The hose clamp comprises a flexible metal band 45 adapted to encircle the sleeve portion like a hoop, with its opposite ends being releasably fastened together by conventional clamping means 46. When the clamping means is tightened, the hoop is constricted and the band 45 applies substantially uniform radially pressure around the full circumference of the encircled sleeve portion 43, thereby assuring a tight fit and a good seal around the thrust flange notwithstanding eccentricities in its external surface.

As is best seen in FIG. 4, the flange portion 44 of the annular member 43,44 is adapted to fit inside the groove 42 formed in the flange 41 of the gearcase sidewall, but it is thinner than the width of this groove. In practice, for example, if the width of the groove 42 were approximately 0.3 inch the thickness of the flange portion 44 would be approximately 0.2 inch or less. The improved sealing means comprises a reinforcing ring 47 of relatively stiff material (e.g., semi-rigid nylon) having concentric annular outer and inner sections. The outer section of the ring 47 is attached to the flange portion 44 to form a unitary assembly. In the illustrated embodiment (FIGS. 5 and 6), the attachment has been accomplished by inserting staples 48 through the juxtaposed ring 47 and flange 44 at a plurality of circumferentially spaced recesses 49 therein. The thickness of the outer section of the ring 47 in an axial direction is approximately equal to the difference between the thickness of the flange portion 44 and the width of the groove 42 so that the reinforced flange portion of the annular member 43,44 will fit tightly in this groove. Because of this tight fit, in combination with the sleeve portion 43 being firmly secured to the axle bearing thrust flange 27, the improved sealing means performs a stiffening function that tends to resist lateral movement and to damp vibrations of the associated sidewall of the gearcase. As a result, the member 43,44 will supplement the physical supporting means (not shown) that are provided at other locations of the gearcase.

The annular inner section of the reinforcing ring 47 is adapted to extend radially inwardly from the groove 42 to within close proximity of the perimeter of the axle gear hub 28, but it will not rub against this hub. A small (e.g., less than approximately 0.25 inch) clearance gap is maintained between these parts. As is shown in FIG. 5, at spaced apart intervals along the inside perimeter of the ring 47 there are a plurality of small radial projections 50 that interact with the hub 28 to ensure that the sealing unit 43,44,47 is located concentrically with respect to the axle gear.

The sealing member 43,44 is so shaped as to form an annular recess or trough 51 between the axle-gear end of its sleeve portion 43 and the outboard side of the inner section of the reinforcing ring 47, which trough encircles the periphery of adjacent ends of the axle gear hub 28 and the axle bearing thrust flange 27 where it collects axle bearing lubricating oil that escapes through the gear hub-thrust flange interface. Preferably, as shown, the trough 51 is formed simply by providing the sleeve portion 43 with a tapered profile or chamfer at the inside diameter of its axle-gear end. At the lowest region of the sealing member there is a slot 52 through the sleeve portion 43 (see FIGS. 5 and 6), and lubricating oil collected in the annular trough 51 will drain through this slot to the road bed. Consequently the trough 51 and the inner section of the ring 47 in combination provide a liquid seal in the annular gap between the axle gear hub and the surrounding edge of the gearcase sidewall, and migration of axle bearing oil into the gear case is effectively discouraged.

While a preferred embodiment of the invention has been shown and described by way of illustration, various modifications thereof will probably occur to persons skilled in the art. It is therefore intended by the concluding claims to cover all such changes and modifications that fall within the true spirit and scope of this invention.

We claim:

1. Improved means for sealing the annular gap between a sidewall of a gearcase of a traction vehicle and the adjacent thrust flange of a non-rotatable, motor-supporting axle bearing disposed on a rotatable axle of the vehicle in a cap that is fastened to the frame of an electric motor the rotatable shaft of which is drivingly coupled to the axle by means of a gear train housed inside the gearcase, the gear train including an axle gear the hub of which is adjacent to said thrust flange, wherein the improvement comprises:

a. an annular member of elastomeric material having a sleeve portion that is adapted to snugly encircle the circumference of said thrust flange and having a flange portion that projects radially outwardly from said sleeve portion and is adapted to fit inside a seal-receiving annular groove formed in an edge of the gearcase sidewall surrounding said axle gear hub, said flange portion being thinner than the width of said groove;

b. means for firmly securing said sleeve portion of said annular member to the circumference of said thrust flange; and c. a reinforcing ring of relatively stiff material having an annular outer section attached to said flange portion of said annular member, the thickness of said outer section in an axial direction being approximately equal to the difference between the thickness of said flange portion and the width of said groove so that the reinforced flange portion of said annular member will fit tightly in said groove, said reinforcing ring also having an annular inner section adapted to extend radially inwardly from said groove to within close proximity of the perimeter of said axle gear hub.

2. The improved sealing means of claim 1, in which said annular member is so shaped as to form an annular trough between the axle-gear end of its sleeve portion and the outboard side of the inner section of said reinforcing ring, which trough encircles the periphery of adjacent ends of said axle gear hub and said axle bearing thrust flange where it collects axle bearing lubricating oil that escapes through the gear hub-thrust flange interface, whereby said trough and said inner section in combination provide an effective liquid seal in the gap between said gear hub and the surrounding edge of said gearcase sidewall.

3. The improved sealing means of claim 2, in which said annular member has a slot through its lowest region to provide a drain for lubricating oil collected in said annular trough.

4. The improved sealing means of claim 2 for a gearcase comprising two complementary halves that cooperate when assembled to house the gear train, in which said annular member comprises a cooperating pair of semi-annular pieces of elastomeric material respectively associated with the two halves of said gearcase sidewall, and in which said reinforcing ring comprises a cooperating pair of semi-annular pieces of relatively stiff material respectively associated with the first-mentioned pair of semi-annular pieces.

5. The improved sealing means of claim 1 for a gearcase comprising two complementary halves that cooperate when assembled to house the gear train, in which said annular member comprises a cooperating pair of semi-annular pieces of elastomeric material respectively associated with the two halves of said gearcase sidewall, and in which said reinforcing ring comprises a cooperating pair of semi-annular pieces of relatively stiff material respectively associated with the first-mentioned pair of semi-annular pieces.

6. The improved sealing means of claim 1, in which the inner section of said reinforcing ring has a plurality of radial projections along its inside perimeter, said projections being adapted to interact with said axle gear hub to locate the sealing means concentrically with respect thereto.

* * * * *